US012580874B1

(12) United States Patent
Gilboa et al.

(10) Patent No.: US 12,580,874 B1
(45) Date of Patent: Mar. 17, 2026

(54) VIRTUAL TAG BASED RESOURCE REALLOCATION FOR COMPUTING CLOUDS

(71) Applicant: Finout Ltd, Tel Aviv (IL)

(72) Inventors: Zohar Yizhar Gilboa, Rehovot (IL);
Nir Winkler, Even Yehuda (IL)

(73) Assignee: Finout Ltd, Tel Aviv (IL)

( * ) Notice: Subject to any disclaimer, the term of this patent is extended or adjusted under 35 U.S.C. 154(b) by 0 days.

(21) Appl. No.: 19/238,640

(22) Filed: Jun. 16, 2025

(51) Int. Cl.
*H04L 47/70* (2022.01)
*H04L 47/76* (2022.01)
(52) U.S. Cl.
CPC ............ *H04L 47/826* (2013.01); *H04L 47/76* (2013.01)
(58) Field of Classification Search
CPC .............. G06F 16/2379; G06F 16/215; G06F 16/2365; G06F 16/27; G06F 16/9024; G06F 16/254; G06F 16/256; G06F 16/288; G06F 16/337; G06F 21/6218; G06F 40/205; G06F 40/295; G06F 16/9535; G06F 16/245; G06F 11/3024; G06F 11/3452; G06F 11/3495; G06F 16/122; G06F 16/1734; G06F 16/178; G06F 16/182; G06F 16/212; G06F 16/219; G06F 16/22; G06F 16/221; G06F 16/2228; G06F 16/2264; G06F 16/2272; G06F 16/23; G06F 16/235; G06F 16/2386; G06F 16/24558; G06F 16/24564; G06F 16/2457; G06F 16/24575; G06F 16/24578; G06F 16/2477; G06F 16/26; G06F 16/273;
G06F 16/28; G06F 16/285; G06F 16/289; G06F 16/29; G06F 16/313; G06F 16/355; G06F 16/901; G06F 16/90344
See application file for complete search history.

(56) References Cited

U.S. PATENT DOCUMENTS

| | | | |
|---|---|---|---|
| 7,912,842 B1 * | 3/2011 | Bayliss | G06F 16/215 |
| | | | 707/749 |
| 9,710,859 B1 * | 7/2017 | Theimer | G06Q 40/10 |
| 2011/0137890 A1 * | 6/2011 | Bestgen | G06F 16/24544 |
| | | | 707/E17.131 |
| 2020/0104184 A1 * | 4/2020 | Subramanian | G06N 3/04 |
| 2023/0251902 A1 * | 8/2023 | Karthikeyan | H04L 43/08 |
| | | | 718/104 |

* cited by examiner

*Primary Examiner* — Djenane M Bayard

(57) ABSTRACT

There is provided a method, comprising: grouping resource records based on respective timestamps and first metadata attributes, each resource record including a resource value indicating utilization of a resource of a computing cloud, adding telemetry records to an indexed dataset separate from the resource records with defined time-based validity periods, each telemetry record including a telemetry value indicating a measurable activity within the computing cloud, each telemetry record is associated with a timestamp and second metadata attributes, normalizing resource values of the resource records and telemetry values of the telemetry records to a defined range representing a common scale, matching the resource records and the telemetry records by matching the normalized resource values and the normalized telemetry values, and generating and assigning virtual tags according to the matches, each virtual tag associating utilization of a specific resource to a specific entity for a specific measurable activity.

19 Claims, 4 Drawing Sheets

```
SELECT cost_records. * , tags.virtual_tag

FROM cost_records

ASOF JOIN telemetry_records

ON cost_records.normalized_value >= telemetry_records.normalized_from

AND cost_records.normalized_value < telemetry_records.normalized_to;
```

VIRTUAL TAG BASED RESOURCE REALLOCATION FOR COMPUTING CLOUDS

BACKGROUND

The present invention, in some embodiments thereof, relates to computing clouds and, more specifically, but not exclusively, to tools for improving resource utilization in computing clouds.

Computing clouds utilize extensive resources (e.g., processors, memory, storage, and network) to service a large number of users. High utilization improves cost-efficiency, while low utilization may indicate wasted resources. Tools like auto-scaling and load balancing help optimize it.

SUMMARY

According to a first aspect, a computer implemented method of allocating resource records to entities using at least one computing cloud, comprises: grouping resource records based on respective timestamps and first metadata attributes, each resource record including a resource value indicating utilization of a resource of a plurality of resources of a computing cloud, adding telemetry records to an indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes, normalizing resource values of the resource records to a defined range, normalizing telemetry values of the telemetry records to the defined range, wherein the define range represents a common scale for the resource values and the telemetry values, matching the resource records and the telemetry records by matching the normalized resource values and the normalized telemetry values, and generating and assigning virtual tags according to the matches, each virtual tag associating utilization of a specific resource to a specific entity for a specific measurable activity.

According to a second aspect, a system computer implemented method for allocating resource records to entities using at least one computing cloud, comprises: at least one processor executing a code for: grouping resource records based on respective timestamps and first metadata attributes, each resource record including a resource value indicating utilization of a resource of a plurality of resources of a computing cloud, adding telemetry records to an indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes, normalizing resource values of the resource records to a defined range, normalizing telemetry values of the telemetry records to the defined range, wherein the define range represents a common scale for the resource values and the telemetry values, matching the resource records and the telemetry records by matching the normalized resource values and the normalized telemetry values, and generating and assigning virtual tags according to the matches, each virtual tag associating utilization of a specific resource to a specific entity for a specific measurable activity.

According to a third aspect, a non-transitory medium storing program instructions for allocating resource records to entities using at least one computing cloud, comprising program instructions which when executed by at least one processor, cause the at least one processor to: group resource records based on respective timestamps and first metadata attributes, each resource record including a resource value indicating utilization of a resource of a plurality of resources of a computing cloud, add telemetry records to an indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes, normalize resource values of the resource records to a defined range, normalize telemetry values of the telemetry records to the defined range, wherein the define range represents a common scale for the resource values and the telemetry values, match the resource records and the telemetry records by matching the normalized resource values and the normalized telemetry values, and generate and assign virtual tags according to the matches, each virtual tag associating utilization of a specific resource to a specific entity for a specific measurable activity.

In a further implementation form of the first, second, and third aspects, the matching is performed using an operation that matches a resource record having a normalized resource value to a telemetry record having a normalized telemetry value that is nearest to the normalized resource value.

In a further implementation form of the first, second, and third aspects, the matching is performed using an operation that matches a telemetry record having a normalized telemetry value to a resource record having a normalized resource value that is nearest to the normalized telemetry value.

In a further implementation form of the first, second, and third aspects, the matching is performed using an ASOF JOIN operation.

In a further implementation form of the first, second, and third aspects, the matching is performed excluding the timestamps.

In a further implementation form of the first, second, and third aspects, the matching is performed excluding an operation that combines every row from one table with every row from another table.

In a further implementation form of the first, second, and third aspects, the matching is performed excluding a Cartesian product operation and/or excluding a CROSS JOIN operation.

In a further implementation form of the first, second, and third aspects, the matching is performed excluding the non-normalized telemetry values and/or the non-normalized resource values.

In a further implementation form of the first, second, and third aspects, each resource record is for the computing cloud of a plurality of computing clouds, and each telemetry record is for the computing cloud of the plurality of computing clouds, wherein the utilized resources are allocated for a plurality of entities using the plurality of computing clouds.

In a further implementation form of the first, second, and third aspects, the defined range is between 0 and 1.

In a further implementation form of the first, second, and third aspects, each resource record indicates cost of using a respective resource.

In a further implementation form of the first, second, and third aspects, the virtual tags are added to a new dimension to the indexed dataset during execution of a query for performing the matching.

In a further implementation form of the first, second, and third aspects, the matching is executed using an operation with a computational complexity of O(N log M), where N denotes a number of resource records and M denotes a number of telemetry records.

In a further implementation form of the first, second, and third aspects, further comprising: identifying larger resource records of the plurality of resource records larger than a threshold, breaking down each large resource record to a plurality of smaller resource records, and performing the matching using the plurality of smaller resource records.

In a further implementation form of the first, second, and third aspects, the breaking down is performed by preserving resource distribution proportions of the larger resource record.

In a further implementation form of the first, second, and third aspects, further comprising: aggregating resource records for each entity based on the virtual tags, and presenting the aggregated resource records for each entity based on the virtual tags.

In a further implementation form of the first, second, and third aspects, the virtual tags are dynamically generated in real time for a recent time window.

In a further implementation form of the first, second, and third aspects, further comprising feeding the virtual tags into at least one process designed to process native labels of the computing cloud.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an exemplary pseudocode for implementing the matching of resource records to telemetry records according to corresponding normalized resource values matched to

Figure 4:
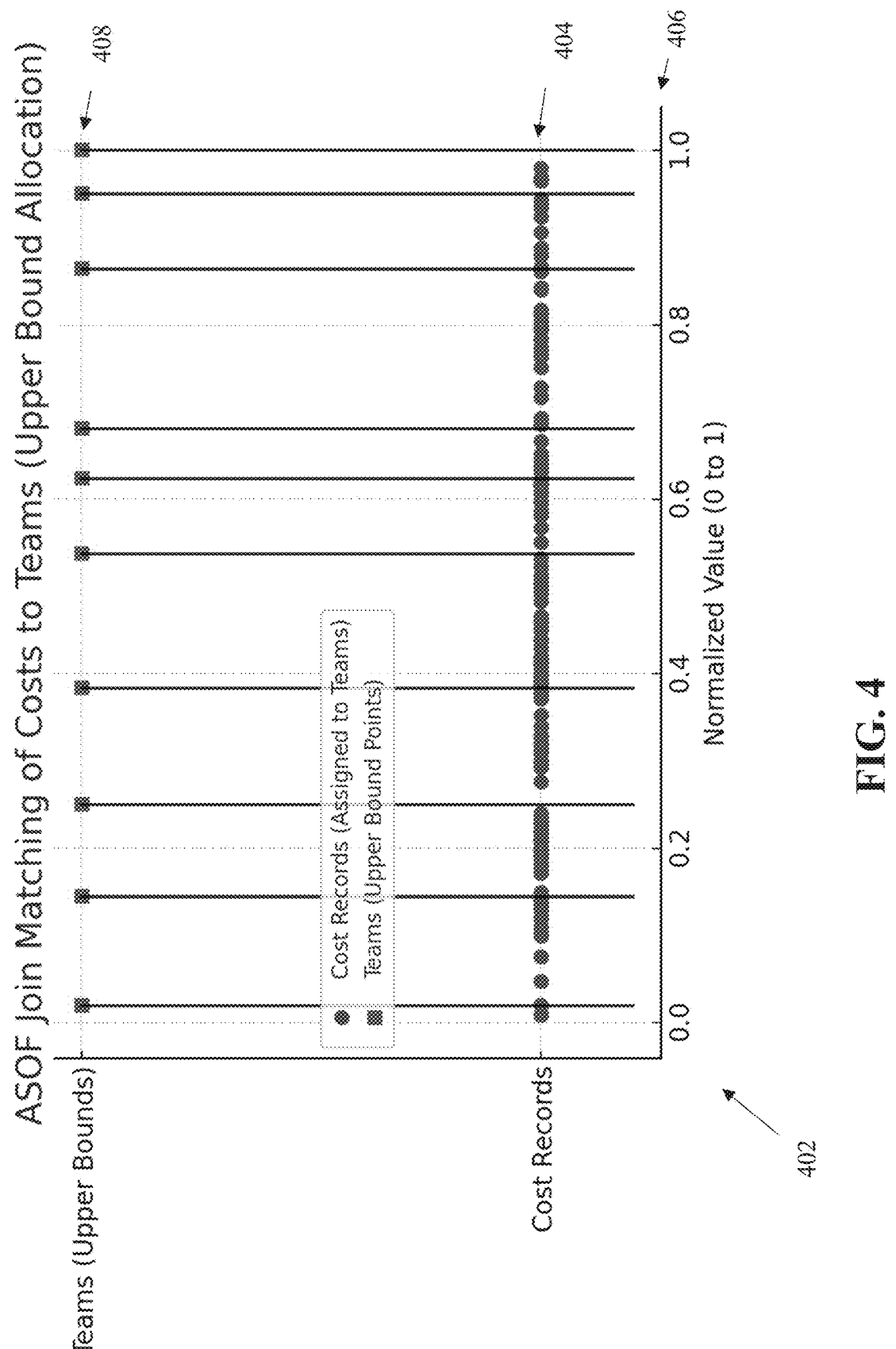

4 normalized telemetry values, in accordance with some embodiments of the present invention; and FIG. 4 is a schematic depicting an example of assigning resource (e.g., cost) records to entities (e.g., teams) based on resource records matched to telemetry records according to corresponding normalized resource values matched to normalized telemetry values, in accordance with some embodiments of the present invention.

DETAILED DESCRIPTION

The present invention, in some embodiments thereof, relates to computing clouds and, more specifically, but not exclusively, to tools for improving resource utilization in computing clouds.

An aspect of some embodiments of the present invention relates to systems, methods, computing devices, and/or code instructions (stored on a data storage device and executable by one or more processors) for allocating resource records, optionally cost records, of using one or more computing clouds to entities using the resources. Resource records are grouped based on respective timestamps and metadata attributes. Each resource record includes a resource value indicating utilization of a resource. Multiple resource records are provided for the multiple resources of one or more computing clouds. Telemetry records are added to an indexed dataset with defined time-based validity periods. The indexed dataset may be a data structure that is separate and/or stored separately from the resource records. Each telemetry record including a telemetry value indicating a measurable activity within the computing cloud. Each telemetry record is associated with a timestamp and metadata attributes (which may be different than the metadata attributes of the resource records). The resource values of the resource records are normalized to a defined range. The telemetry values of the telemetry records are normalized to the defined range. The define range represents a common scale for both the resource values and for the telemetry values. The resource records and the telemetry records are matched, by matching the corresponding normalized resource values and the normalized telemetry values. The matching may be performed using an operation that matches a resource record having a normalized resource value to a telemetry record having a normalized telemetry value that is nearest to the normalized resource value (or vice versa), for example, an ASOF JOIN operation. The matching may be performed without using (i.e., excluding use of) the timestamps. The matching may be performed without (i.e., excluding use of) another operation that combines every row from one table with every row from another table, for example, a Cartesian produce such as CROSS JOIN operation or other corresponding operation. The matching may be performed without using (i.e., excluding use of) the non-normalized (i.e., original and/or absolute values of the) telemetry values and/or the non-normalized resource values. Virtual tags are generated and assigned according to the matches. Each virtual tag associates utilization of a specific resource to a specific entity for a specific measurable activity. The virtual tags may be aggregated, for example, for each specific entity, to obtain a total of the measurable activities for each specific entity.

It is to be understood that the ASOF JOIN operation described herein, which is an operation in Structured Query Language (SQL) and is not meant to be necessarily limiting. Other corresponding operations in other languages that match rows from one table with another row in another table based on their proximity, such as temporal proximity and/or sequential ordering, may be substituted accordingly.

At least one embodiment described herein addresses the technical problem of improving computational efficiency of a computer allocating resource utilization records (e.g., cost allocation) to multiple different entities using multiple different resources of one or more computing clouds in an efficient manner that is scalable to accommodate a large number of entities and/or resources. At least one embodiment described herein improves computational efficiency of a computer (e.g., processor) allocating resource utilization records (e.g., cost allocation) to multiple different entities using multiple different resources of one or more computing clouds. At least one embodiment described herein improves upon prior approaches, by providing a more computationally efficient approach that is scalable. At least one embodiment described herein provides the practical application of improving computational efficiency of a computer (e.g., processor) allocating resource utilization records (e.g., cost allocation) to multiple different entities using multiple different resources of one or more computing clouds.

In at least some embodiments, the aforementioned technical problem is solved by, and/or the aforementioned improvement of computational efficiency is achieved by, and/or the aforementioned improvement over prior approaches is achieved by, and/or the aforementioned practical application is provided by matching resource records and telemetry records according to a matching of the corresponding normalized resource values and the normalized telemetry values, optionally using an operation that matches a resource record having a normalized resource value to a telemetry record having a normalized telemetry value that is nearest to the normalized resource value (or vice versa), for example, an ASOF JOIN operation. The operation such as ASOF JOIN using the normalized values, is more computationally efficient that using timestamps and/or another operation that combines every row from one table with every row from another table, for example, a Cartesian produce such as CROSS JOIN operation or other corresponding operation. Virtual tags are generated and assigned according to the matches. Each virtual tag associates utilization of a specific resource to a specific entity for a specific measurable activity.

Moreover, normalization of both the resource values and the telemetry values to a common defined range helps map each resource value to its corresponding telemetry value. The mapping using the normalized values of the resource values and the telemetry values may help improve the accuracy and/or efficiency of the matching process described herein.

The matching may be performed without using (i.e., excluding use of) one or more of the following, which improves computation efficiency of the computing performing the matching:

The timestamps.

Another operation that combines every row from one table with every row from another table, for example, a Cartesian produce such as CROSS JOIN operation or other corresponding operation.

The non-normalized (i.e., original and/or absolute values of the) telemetry values and/or the non-normalized resource values.

In at least some embodiments, the aforementioned technical problem is solved by, and/or the aforementioned improvement of computational efficiency is achieved by, and/or the aforementioned improvement over prior approaches is achieved by, and/or the aforementioned practical application is provided by, an operation that matches a resource record having a normalized resource value to a telemetry record having a normalized telemetry value that is nearest to the normalized resource value (or vice versa), for example, an ASOF JOIN methodology to avoid using an operation that combines every row from one table with every row from another table, for example, a Cartesian produce such as CROSS JOIN. Using the ASOF JOIN operation significantly reduces complexity from Mx N to a more efficient allocation process. Instead of performing the ASOF JOIN based on timestamps, at least one embodiment described herein normalizes resource utilization (e.g., cost) and telemetry ranges between a defined range (e.g., 0 and 1) and matches records based on these normalized values. Instead of performing a full CROSS JOIN, where every resource record is compared against all telemetry records, the ASOF JOIN finds the most relevant telemetry record based on the normalized resource values. The process may help ensures that each resource record is associated with the most applicable telemetry record by matching normalized values rather than absolute values and/or timestamps. This enables real-time and/or scalable distribution of resource utilization (e.g., cost) across cloud resources without excessive computational overhead.

Some existing mechanisms for allocation of resource utilization (e.g., cost) rely on an operation that combines every row from one table with every row from another table, for example, a Cartesian produce such as CROSS JOIN operation, to associate resource (e.g., cost) records with their respective entities (e.g., business units), leading to quadratic complexity that scales poorly with large datasets. At least one embodiment described herein replaces the aforementioned inefficient approach with an ASOF JOIN. Moreover, instead of relying on timestamps used by the CROSS JOIN operations, at least one embodiment normalizes resource (e.g., cost) and telemetry records within the defined range (e.g., between 0 and 1) and matches based on these normalized values. The result of this calculation is the assignment of a virtual tag, a new dimension to the data that is computed during query time. This allows for resource utilization (e.g., cost) attribution to entities (e.g., business units) while maintaining scalability and/or reducing processing time.

At least one embodiment provides for seamlessly integrates into existing frameworks, by utilizing an intelligent tagging mechanism that applies rules across multiple cloud environments in real time. The introduction of the ASOF JOIN approach with normalized values ensures that resource utilization records (e.g., costs) are allocated without requiring full Cartesian product computations, making it viable for high-scale cloud billing environments.

The ASOF JOIN mechanism is selected for reducing redundant comparisons, leading to O(N log M) complexity instead of O(M×N) using other approaches, where M denotes the number of cost records and N denotes the number of telemetry records. Normalization of the resource utilization values (e.g., cost) and/or telemetry values improves match efficiency, making the allocation process robust across varying data scales. Parallel processing and/or indexing optimizations may further enhance the performance of the matching process.

Normalization of both the resource values and the telemetry values to the common defined range helps map each resource value to its corresponding telemetry value. The mapping using the normalized values of the resource values and the telemetry values may help improve the accuracy and/or efficiency of the matching process described herein.

The virtual tags may comply with existing formats of native labels of the computing cloud(s), which enables analysis using existing analysis tools designed to analyze the native labels. For example, for generating anomalies for each business unit, and/or for generating a budget per team.

In cases where a single resource utilization record (e.g., cost item) is significantly large, the large record may be automatically broken down into smaller resource utilization records (e.g., cost line items). The breaking down may help ensures that the matching process distributes resource utilization values (e.g., costs) more accurately without skewing entity (e.g., business unit) assignments due to oversized resource utilization (e.g., cost) entries. The breaking down of the large resource utilization (e.g., cost) records may be selectively performed for increasing the probability that all telemetry values receive some form of representation, ensuring a more balanced and representative allocation of costs across business units. The approach used for performing the breaking down may be selected for preserving the original resource utilization (e.g., cost) distribution proportions while ensuring optimal tag assignment.

The following are one or more potential advantages of at least one embodiment:

Avoids expensive CROSS JOIN operations, reducing computational overhead.

Optimized for large-scale cloud cost allocation, handling millions of cost records efficiently.

Uses normalized cost and telemetry values, improving accuracy and scalability.

Supports real-time and/or historical tagging, ensuring accurate cost distribution across entities (e.g., business units).

Ensures fairness by breaking down large resource utilization records (e.g., cost items), preventing disproportionate resource utilization (e.g., cost) allocations and increasing telemetry representation.

Scalable across multiple cloud providers, integrating seamlessly into existing resource utilization (e.g., cost) analysis pipelines.

Dynamically computes virtual tags at query time, allowing for flexible and real-time entity (e.g., business unit) resource utilization (e.g., cost) attribution.

At one embodiment significantly enhances the efficiency of cost reallocation within virtual tagging systems. By utilizing an ASOF JOIN instead of a CROSS JOIN, a substantial reduction in computational complexity is achieved, making real-time entity (e.g., business unit) resource utilization (e.g., cost) allocation feasible at scale. Additionally, the ability to break down large resource utilization (e.g., cost) records (e.g., items) into smaller segments further improves accuracy and fairness in allocation. The result of this approach is a dynamically computed virtual tag, providing a new dimension to cloud resource utilization (e.g., cost) data during query execution. The normalization of resource utilization values (e.g., cost) and telemetry values ensures a more accurate and scalable allocation process. Dynamic and/or performant resource utilization (e.g., cost) tagging solutions may be implemented across diverse cloud environments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
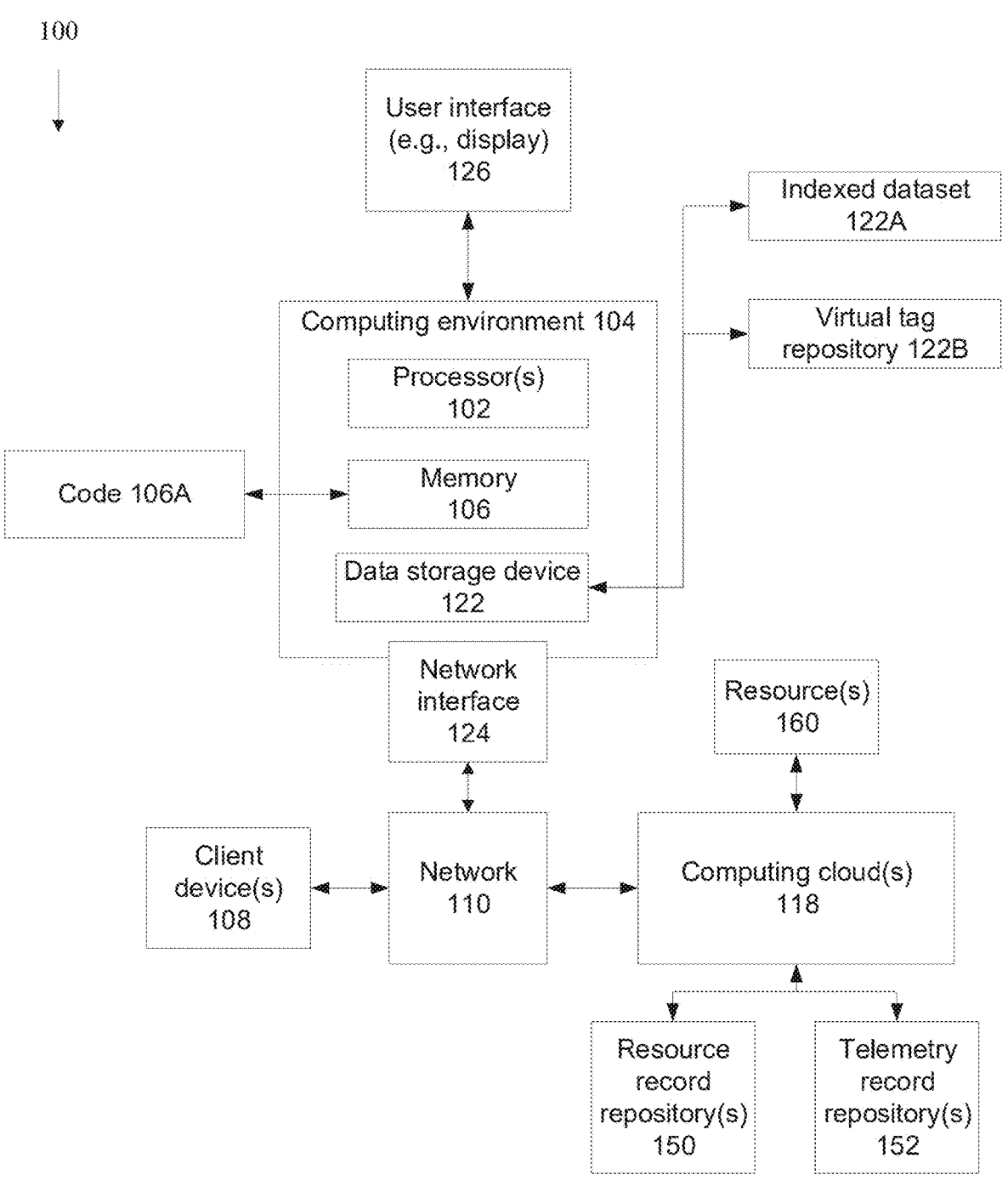
FIG. 1 is a block diagram of components of a system for allocating resource records to entities using at least one computing cloud based on resource records matched to telemetry records according to corresponding normalized resource values matched to normalized telemetry values, in accordance with some embodiments of the present invention.
Figure 2:
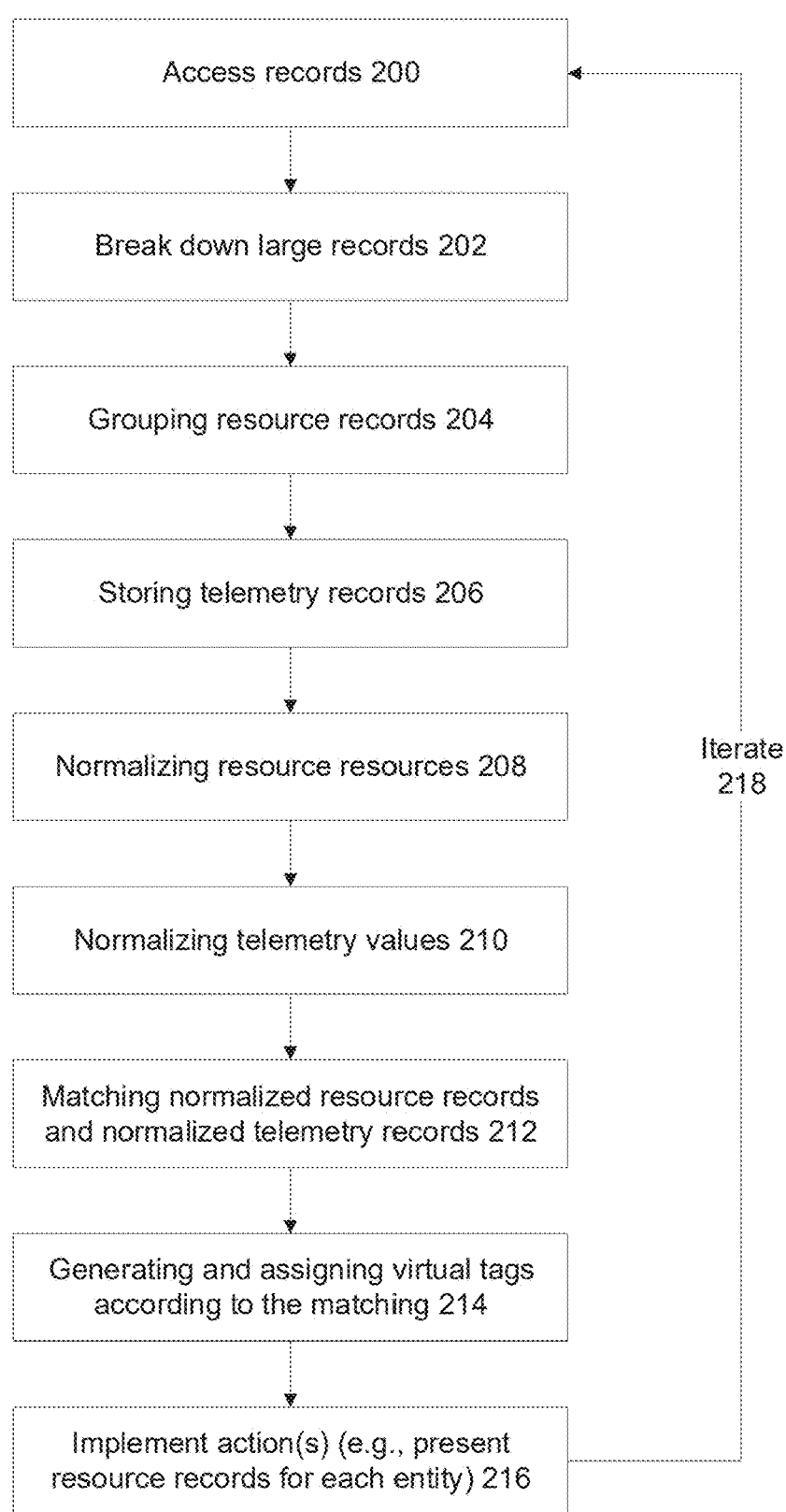
FIG. 2 is a flowchart of a method of allocating resource records to entities using at least one computing cloud based on resource records matched to telemetry records according to corresponding normalized resource values matched to normalized telemetry values, in accordance with some embodiments of the present invention.

Reference is now made to FIG. 1, which is a block diagram of components of a system 100 for allocating resource records to entities using at least one computing cloud 118 based on resource records matched to telemetry records according to corresponding normalized resource values matched to normalized telemetry values, in accordance with some embodiments of the present invention. Reference is also made to FIG. 2, which is a flowchart of a method of allocating resource records to entities using at least one computing cloud based on resource records matched to telemetry records according to corresponding normalized resource values matched to normalized telemetry values, in accordance with some embodiments of the present invention. Reference is also made to FIG. 3, which is an exemplary pseudocode 302 for implementing the matching of resource records to telemetry records according to corresponding normalized resource values matched to normalized telemetry values, in accordance with some embodiments of the present invention. Reference is also made to FIG. 4, which is a schematic 402 depicting an example of assigning resource (e.g., cost) records to entities (e.g., teams) based on resource records matched to telemetry records according to corresponding normalized resource values matched to normalized telemetry values, in accordance with some embodiments of the present invention.

Referring now back to FIG. 1, system 100 may implement the acts of the method described with reference to FIG. 2, by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 matches resource records (e.g., from a resource record repository 150) and telemetry records (e.g., from a telemetry record repository 152) of a computing cloud(s) 118, and generates and assigns virtual tags (e.g., stored in a virtual tag repository 122B) according to the matches, where each virtual tag associates utilization of specific resources 160 of the computing cloud(s) 118 to a specific entity (e.g., using client device(s) 108) to a specific measurable activity.

Computing cloud 118 is associated with and/or hosts one or more resources 160 which are utilized by multiple entities, for example, via respective client devices 108.

Examples of resources 160 include: virtual machines, data storage, network bandwidth, managed databases, and use of software (e.g., software as a service).

Examples of client devices 108 used by different entities to access resources 160 of computing cloud(s) 118 include a client terminal, a server, a desktop computer, and a mobile device.

Computing cloud(s) 118 is not meant to be necessarily limiting, and may be implemented as another platform that hosts services and/or resources which are accessed by multiple users which may be external users (accessing via the network, via a virtual interface such as an application programming interface (API) and the like), for example, a virtual server, a virtual machine, and the like.

Multiple architectures of system 100 based on computing environment 104 may be implemented. For example:

Computing environment 104 executing stored code instructions 106A, may be implemented as one or more servers (e.g., network server, web server, a computing cloud, a virtual server) that provides centralized services to one or more computing clouds 118 and/or client devices 108, for centrally matching resource records 150 and/or telemetry records 152 of the computing clouds(s) 118 for assigning to specific entities. Services may be provided, for example, to one or more computing clouds(s) 118 and/or client terminal(s) 108 over network 110, by accessing and/or being provided the resource records 150 and/or the telemetry records 152 associated with the computing clouds(s) 118. Services may be provided by computing environment 104 to client terminals 108 and/or computing clouds(s) 118, for example, as software as a service (SaaS), a software interface (e.g., application programming interface (API), software development kit (SDK)), an application for local download to the client terminal(s) 108 and/or computing clouds(s) 118, an add-on to a web browser running on client terminal(s) 108 and/or computing clouds(s) 118, and/or providing functions using a remote access session to the client terminals 108 and/or computing cloud(s) 118, such as through a web browser executed by client terminal 108 and/or computing cloud(s) 118 accessing a web sited hosted by computing environment 104. For example, computing environment 104 remotely accesses resource records 150 and telemetry records 152 of computing cloud(s) 118. In yet another example, computing cloud(s) 118 uploads its resource records 150 and telemetry records 152 to computing environment 104.

In another example, computing environment 104 may be implemented to provide dedicated and/or local services to a certain computing cloud 118. For example, computing environment 104 may be integrated with computing cloud 118, such as code 106A of computing environment 104 may be executed by the processor(s) of computing cloud 118 by accessing resource records 150 and telemetry records 152 hosted by computing cloud(s) 118. In another example, computing environment 104 may be implemented as an external device, such as an administrative server, in dedicated communication with computing cloud 118, to provide the services of analyzing and/or matching resource records 150 and/or telemetry records 152 for generating and/or allocated virtual tags 122B.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by hardware processor(s) 102.

Computing environment 104 may include a data storage device 122 for storing data, for example, indexed dataset 122A, virtual tag repository 122B set to store generated virtual tags, and/or other data described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may present the generated virtual tags and/or other data described herein. User interface 126 may be designed to enable input of data, for example, for selection of the computing cloud(s) 118 and/or resources(s) 160) having records to analyze. Exemplary user interfaces 126 include, for example, one or more of, a touchscreen, a display, gesture activation devices, a keyboard, a mouse, and voice activated software using speakers and microphone.

Referring now back to FIG. 2, resource records may refer to cost records, and/or may serve as a proxy for cost records. Each resource record indicates utilization of a certain resource, which may including indicting the cost of using the certain resource. The terms resource record and cost record may sometimes be interchanged.

At 200, resource records and/or telemetry records of one or more computing clouds used by multiple entities are accessed.

The entities may be, for example, individual users, groups (e.g., business units), and the like.

The resource records and/or telemetry records may be for one or more resources of the computing cloud(s), optionally per resource. Examples of resources include:

Virtual Machines (VMs): Virtual machines are software-based computing instances that mimic physical computers. Different types of VMs may be offered with varying configurations of CPU, memory, storage, and networking resources.

Containers: Containers are lightweight, portable, and self-contained units of software that package an application and its dependencies together.

Storage: Different types of storage resources may be offered, for example, object storage, block storage, and file storage.

Databases: For example, managed database services.

Networking: For example, virtual networks, load balancers, VPNs, firewalls, and other networking components that enable secure and efficient communication between cloud resources and the internet.

Content Delivery Networks (CDNs): CDNs are distributed networks of servers that cache and deliver static content (e.g., images, videos, CSS, and JavaScript files) to users based on their geographic location, improving website performance and reducing latency.

Serverless Computing: Serverless computing services allow developers to run code without provisioning or managing servers, enabling pay-per-use billing and automatic scaling.

Managed Services: For example, for application deployment, for batch and streaming data processing, and for event-driven architectures.

Analytics and Big Data: For example, for data analytics, data warehousing, and big data processing.

Artificial Intelligence (AI) and Machine Learning (ML): For example, pre-trained models, custom model training, and inference platforms.

Internet of Things (IOT): For example, for managing and processing data from connected devices.

Each telemetry record includes a telemetry value indicating a measurable activity within the computing cloud, optionally within a resource of the computing cloud. The telemetry value indicating the measurable activity may be an indication of utilization of a resource, for example, amount of stored data, amount of used network bandwidth, utilization of a virtual machine, and the like.

The activity may be measured by a code sensor and/or a processor, which may monitor and/or access and/or query the specific resource within the computing cloud(s).

Each telemetry record is associated with a timestamp and/or metadata attributes. The metadata attributes may include additional data about the telemetry value. For example:

Resource ID: A unique identifier for the cloud resource (e.g., virtual machine, container, or service) from which the telemetry data was collected.

Resource Type: The type of cloud resource, such as a virtual machine, container, load balancer, or database instance.

Metric Name: The name or identifier of the specific metric being measured, such as CPU utilization, memory usage, or network throughput.

Metric Unit: The unit of measurement for the metric, such as percentage, bytes, or requests per second.

Metric Dimensions: Additional dimensions or attributes that provide context for the metric, such as the instance ID, application name, or environment (e.g., production, staging, or development).

Telemetry Source: The component or service responsible for collecting and transmitting the telemetry data, such as a monitoring agent, log aggregator, or telemetry pipeline.

Data Collection Method: The method or technique used to collect the telemetry data, such as polling, streaming, or event-driven collection.

Each cloud record includes a resource value indicating utilization of a resource of the computing cloud. The resource record may include an indication of cost of using the resource.

The utilization of the resource may be measured by a code sensor and/or a processor, which may monitor and/or access and/or query the specific resource within the computing cloud(s).

Each resource record is associated with a timestamp and/or metadata attributes. The metadata attributes may include additional data about the resource value. For example:

Resource ID: A unique identifier for the cloud resource being consumed, such as a virtual machine instance, storage volume, or database instance.

Resource Type: The type of cloud resource, such as compute, storage, networking, or managed services.

Service Name: The name of the specific cloud service being used.

Usage Quantity: The amount or quantity of the resource consumed, such as the number of hours a virtual machine was running or the amount of data transferred over the network.

Usage Unit: The unit of measurement for the usage quantity, such as hours, gigabytes, or requests.

Cost Rate: The rate or price charged for the usage of the resource, typically based on a predefined pricing model.

Total Cost: The total cost incurred for the specific resource usage, calculated by multiplying the usage quantity by the cost rate.

Cost Allocation: Information about how the cost is allocated or attributed to different departments, projects, or cost centers within the organization.

Billing Period: The time period or billing cycle to which the cost record belongs, such as a month or a specific date range.

Account ID: The identifier of the cloud account or subscription associated with the resource usage.

Region or Availability Zone: The geographic location or data center where the cloud resource was provisioned and used.

Cost Category: A classification or categorization of the cost, such as compute, storage, data transfer, or licensing fees.

Cost Tags: User-defined tags or labels that can be applied to cost records for better organization and cost allocation.

At 202, large resource records may be identified and broken down.

The large resource records may be identified as resource records larger than a threshold. For example, including multiple resources, including multiple instances of utilization, and the like.

Each large resource record may be broken down to multiple smaller resource records. Each small resource record may be smaller than the threshold, or smaller than a second threshold.

The breaking down of the large resource record into multiple smaller resource records may be performed by preserving resource distribution proportions of the larger resource record. For example, the large resource record may include multiple instances of utilization of the resource. The large resource record may be broken down into smaller records each including a single instance of utilization. In another example, the large resource record may include utilization for multiple resources and/or for multiple aspects of the same resource. The large resource record may be broken down into smaller records each including a single resource and/or a single aspect. The smaller resource records are processed as described herein in place of the large resource record.

At 204, resource records may be grouped based on respective timestamps and/or metadata attributes. For example, resource records having timestamps during a defined time interval are grouped, for example, 8:00 AM to 5:00 PM, per daily 24 hour interval, and the like.

At 206, an indexed dataset with defined time-based validity periods may be created and/or accessed.

The dataset may be indexed, for example, corresponding to the common range used for normalization of the telemetry values and the resource values, according to the raw resource values, according to the raw telemetry values, and/or according to the metadata attributes. The indexing may enable fast look-up and/or fast matching of the telemetry records with the resource records.

The indexing may be implemented as a key-value pair used to organize and/or manage the matched resource records and/or telemetry values.

The indexing may be implemented as tags and/or labels, optionally metadata, associated with the resources and/or telemetry values, to help identify, group and/or filter the resources and/or telemetry values, for example, for automation, monitoring, cost allocation, access control, and the like.

The dataset may be a separate data structure from the resource records, for example, stored separately and/or separately defined.

The indexed dataset may be a pre-existing and/or pre-defined data structure, for example, defined by the cloud provider for managing the resources of the computing cloud.

The telemetry records may be stored in the indexed dataset.

At 208, the resource values of the resource records are normalized to a defined range, for example, 0-1, 0-100, or other range.

Each respective resource value of each respective record may be normalized by dividing by the largest value of a set of the resource values.

At 210, the telemetry values of the telemetry records are normalized to the defined range.

Each respective telemetry value of each respective record may be normalized by dividing by the largest value of a set of the telemetry values.

The resource values and the telemetry values are normalized to a common scale, i.e., to the same range. Normalization of both the resource values and the telemetry values to the common defined range helps map each resource value to its corresponding telemetry value. The mapping using the normalized values of the resource values and the telemetry values may help improve the accuracy and/or efficiency of the matching process described herein.

The resource values and the telemetry values are normalized to a common scale, i.e., to the same range. Normalization of both the resource values and the telemetry values to the common defined range helps improve the accuracy and/or efficiency of the matching process described herein.

At 212, the resource records and the telemetry records are matched, by matching the corresponding normalized resource values and the normalized telemetry values.

The resource records and the telemetry records are matched, by matching the corresponding normalized resource values and the normalized telemetry values. The matching may be performed using an operation that matches a resource record having a normalized resource value to a telemetry record having a normalized telemetry value that is nearest to the normalized resource value, for example, an ASOF JOIN operation. Alternatively, the matching may be performed using the operation that matches a telemetry record having a normalized telemetry value to a resource record having a normalized resource value that is nearest to the normalized telemetry value, for example, the ASOF JOIN operation. The operation (e.g., ASOF JOIN) may be executed with a computational complexity of O(N log M), where N denotes a number of resource records and M denotes a number of telemetry records.

The matching may be performed without using (i.e., excluding use of) the timestamps.

The matching may be performed without (i.e., excluding use of) another operation that combines every row from one table with every row from another table, for example, a Cartesian produce such as CROSS JOIN operation or other corresponding operation.

At 214, tags are generated and/or assigned according to the matches.

The tags may be virtual tags, which may be dynamically generated and/or dynamically added to the existing indexed dataset which may be used by the cloud provider for monitoring and/or managing the computing cloud.

The virtual tags may be dynamically generated, for example, for recent time intervals (e.g., past day, past week, past month, and the like).

The dynamic generation of the virtual tags may be triggered by an event, for example, generation of new resource records and/or new telemetry records, a new billing interval, and the like.

The newly generated virtual tags may replace preceding virtual tags.

The virtual tags may be implemented as metadata.

The virtual tags may comply with existing formats of native labels of the computing cloud(s), which enables analysis using existing analysis tools designed to analyze the native labels. For example, for generating anomalies for each business unit, and/or for generating a budget per team.

Each virtual tag may associate utilization of a specific resource (e.g. cost) to a specific entity for a specific measurable activity.

The virtual tags may be added to a new dimension to the indexed dataset, optionally during execution of a query for performing the matching. The virtual tag may be dynamically computed as the new dimension in the indexed dataset during query execution based on the matched telemetry record.

The virtual tags may be dynamically generated in real time for a recent time window.

The virtual tag may be implemented as a key-value pair used to organize and/or manage the matched resource records and/or telemetry values.

The indexing may be implemented as tags and/or labels, optionally metadata, associated with the resources and/or telemetry values, to help identify, group and/or filter the resources and/or telemetry values, for example, for automation, monitoring, cost allocation, access control, and the like.

At 216, one or more actions may be taken according to the virtual tags.

Resource records may be are aggregated for each entity based on the virtual tags. The resource records may indicate costs incurred by each entity for utilizing one or more resources of the computing cloud.

The aggregated resource records for each entity may be presented based on the virtual tags.

The virtual tags may be analyzed using existing analysis tools designed to analyze native labels of the computing cloud. For example, for identifying anomalies for each business unit, for generating a budget per team, and the like.

The virtual tags may be fed into one or more processes designed to process native labels of the computing cloud. The virtual tags may be processed in a manner similar to processing of the native labels, enabling using existing tools designed for processing native labels.

At 218, one or more features described with reference to 202-216 may be iterated.

Each iteration may be performed over a defined time interval, for example, every day, every week, every billing period, and the like. Alternatively or additionally, each iteration may be performed in response to an event, for example, a user request for a defined historical time period, in response to an audit, in response to detection of an anomaly, and the like.

Iterations may help ensure real-time updates and/or historical recalculations as new data arrives. Retrospective adjustments may be performed, for helping to ensure that entity (e.g., business unit) allocations remain accurate even as new tagging rules are introduced.

Referring now back to FIG. 3 exemplary pseudocode 302 for implementing the matching of resource records to telemetry records according to corresponding normalized resource values matched to normalized telemetry values, is presented. Pseudocode 302 is written for implementation in SQL using the ASOF JOIN operation. It is noted that pseudocode 302 is not necessarily limiting, and may be adapted for implementation in other languages using other similar corresponding operations.

Referring now back to FIG. 4, schematic 402 depicts resource records, each represented by a circle 404, placed along a defined scale 406 from 0 to 1, according to their corresponding normalized resource values. The resource records 404 are assigned to different telemetry values, i.e., entities (e.g., teams) 408, each represented by a square 408. Each resource record 404 is matched to the closest telemetry values, i.e. team 408, by matching the normalized resource value of the corresponding resource record to the closest normalized telemetry value of the corresponding team.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant resource records and telemetry records will be developed and the scope of the term record is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of allocating resource records to entities using at least one computing cloud, comprising:

in a plurality of iterations, dynamically in real time, each iteration for a respective recent time window, by at least one hardware processor of a computing environment:

accessing through a communication network at least one resource record repository stored in at least one computing cloud;

accessing through said communication network at least one telemetry record repository stored in said at least one computing cloud;

grouping resource records based on respective timestamps and first metadata attributes, each resource record including a resource value indicating utilization of a resource of a plurality of resources of the computing cloud;

accessing an indexed dataset stored on a storage device and adding telemetry records to the indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes;

computing normalized resource values by normalizing resource values of the resource records according to a pre-defined range;

computing normalized telemetry values by normalizing telemetry values of the telemetry records according to the pre-defined range, wherein the pre-defined range represents a common scale used for the normalization computation of the resource values and the normalization computation of the telemetry values;

matching the normalized resource values and the normalized telemetry values; and generating and assigning virtual tags for pairs of resource records and telemetry values identified by said matching, each virtual tag associating utilization of a specific resource to a specific entity for a specific measurable activity based on a respective pair of resource record and telemetry value;

storing said virtual tags on said storage device; and controlling access of at least one client device through said communication network to at least one resource of said computing cloud according to said virtual tags.

2. The computer implemented method of claim 1, wherein the matching is performed using an operation that matches a resource record having a normalized resource value to a telemetry record having a normalized telemetry value that is nearest to the normalized resource value.

3. The computer implemented method of claim 1, wherein the matching is performed using an operation that matches a telemetry record having a normalized telemetry value to a resource record having a normalized resource value that is nearest to the normalized telemetry value.

4. The computer implemented method of claim 1, wherein the matching is performed using an ASOF JOIN operation.

5. The computer implemented method of claim 1, wherein the matching is performed excluding the timestamps.

6. The computer implemented method of claim 1, wherein the matching is performed excluding an operation that combines every row from one table with every row from another table.

7. The computer implemented method of claim 1, wherein the matching is performed excluding a Cartesian product operation and/or excluding a CROSS JOIN operation.

8. The computer implemented method of claim 1, wherein the matching is performed excluding the non-normalized telemetry values and/or the non-normalized resource values.

9. The computer implemented method of claim 1, wherein each resource record is for the computing cloud of a plurality of computing clouds, and each telemetry record is for the computing cloud of the plurality of computing clouds, wherein the utilized resources are allocated for a plurality of entities using the plurality of computing clouds.

10. The computer implemented method of claim 1, wherein the pre-defined range is between 0 and 1.

11. The computer implemented method of claim 1, wherein each resource record indicates cost of using a respective resource.

12. The computer implemented method of claim 1, wherein the virtual tags are added to a new dimension to the indexed dataset during execution of a query for performing the matching.

13. The computer implemented method of claim 1, wherein the matching is executed using an operation with a computational complexity of O(N log M), where N denotes a number of resource records and M denotes a number of telemetry records.

14. The computer implemented method of claim 1, further comprising:

identifying larger resource records of the plurality of resource records larger than a threshold;

breaking down each large resource record to a plurality of smaller resource records; and performing the matching using the plurality of smaller resource records.

15. The computer implemented method of claim 14, wherein the breaking down is performed by preserving resource distribution proportions of the larger resource record.

16. The computer implemented method of claim 1, further comprising:

aggregating resource records for each entity based on the virtual tags; and presenting the aggregated resource records for each entity based on the virtual tags.

17. The computer implemented method of claim 1, further comprising feeding the virtual tags into at least one process designed to process native labels of the computing cloud.

18. A system for allocating resource records to entities using at least one computing cloud, comprising:

at least one processor executing a code for:

in a plurality of iterations, dynamically in real time, each iteration for a respective recent time window:

accessing through a communication network at least one resource record repository stored in at least one computing cloud;

accessing through said communication network at least one telemetry record repository stored in said at least one computing cloud;

grouping resource records based on respective timestamps and first metadata attributes, each resource record including a resource value indicating utilization of a resource of a plurality of resources of the computing cloud;

accessing an indexed dataset stored on a storage device and adding telemetry records to the indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes;

computing normalized resource values by normalizing resource values of the resource records according to a pre-defined range;

computing normalized telemetry values by normalizing telemetry values of the telemetry records according to the pre-defined range, wherein the pre-defined range represents a common scale used for the normalization computation of the resource values and the normalization computation of the telemetry values;

matching the normalized resource values and the normalized telemetry values; generating and assigning virtual tags for pairs of resource records and telemetry values identified by said matching, each virtual tag associating utilization of a specific resource to a specific entity for a specific measurable activity based on a respective pair of resource record and telemetry value;

storing said virtual tags on said storage device; and controlling access of at least one client device through said communication network to at least one resource of said computing cloud according to said virtual tags.

19. A non-transitory medium storing program instructions for allocating resource records to entities using at least one computing cloud, comprising program instructions which when executed by at least one processor, cause the at least one processor to:

in a plurality of iterations, dynamically in real time, each iteration for a respective recent time window:

access through a communication network at least one resource record repository stored in at least one computing cloud;

access through said communication network at least one telemetry record repository stored in said at least one computing cloud;

group resource records based on respective timestamps and first metadata attributes, each resource record including a resource value indicating utilization of a resource of a plurality of resources of the computing cloud;

access an indexed dataset stored on a storage device and add telemetry records to the indexed dataset with defined time-based validity periods, the indexed dataset is a data structure that is separate from the resource records, each telemetry record including a telemetry value indicating a measurable activity within the computing cloud, each telemetry record is associated with a timestamp and second metadata attributes;

compute normalized resource values by normalizing resource values of the resource records according to a pre-defined range;

compute normalized telemetry values by normalizing telemetry values of the telemetry records according to the defined range, wherein the pre-defined range represents a common scale used for the normalization computation of the resource values and the normalization computation of the telemetry values;

match the normalized resource values and the normalized telemetry values;

generate and assign virtual tags for pairs of resource records and telemetry values identified by said matching, each virtual tag associating utilization of a specific resource to a specific entity for a specific measurable activity based on a respective pair of resource record and telemetry value;

store said virtual tags on said storage device; and control access of at least one client device through said communication network to at least one resource of said computing cloud according to said virtual tags.

* * * * *